US012541980B2

(12) United States Patent
Dieckmann et al.

(10) Patent No.: US 12,541,980 B2
(45) Date of Patent: *Feb. 3, 2026

(54) METHOD FOR DETERMINING OBJECT INFORMATION RELATING TO AN OBJECT IN A VEHICLE ENVIRONMENT, CONTROL UNIT AND VEHICLE

(71) Applicant: ZF CV Systems Global GmbH, Bern (CH)

(72) Inventors: Thomas Dieckmann, Pattensen (DE); Tobias Klinger, Springe (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 324 days.

This patent is subject to a terminal disclaimer.

(21) Appl. No.: 17/821,378

(22) Filed: Aug. 22, 2022

(65) Prior Publication Data

US 2022/0398852 A1    Dec. 15, 2022

Related U.S. Application Data

(63) Continuation of application No. PCT/EP2021/055826, filed on Mar. 9, 2021.

(30) Foreign Application Priority Data

Mar. 9, 2020   (DE) .................. 10 2020 106 301.6

(51) Int. Cl.
*G06V 20/58*   (2022.01)
*G06T 7/70*    (2017.01)
(Continued)

(52) U.S. Cl.
CPC ............... *G06V 20/58* (2022.01); *G06T 7/70* (2017.01); *G06V 10/44* (2022.01); *G06V 10/761* (2022.01);
(Continued)

(58) Field of Classification Search
CPC ...... G06V 20/58; G06V 10/44; G06V 10/761; G06V 10/771; G06V 2201/07; G06T 7/70; G06T 2207/30252; G06T 7/593
See application file for complete search history.

(56) References Cited

U.S. PATENT DOCUMENTS 6,483,429 B1   11/2002  Yasui et al.
2005/0201593 A1  9/2005  Sawada et al.
(Continued)

FOREIGN PATENT DOCUMENTS

CN   107539218 A   1/2018
CN   109062205 A   12/2018
(Continued)

OTHER PUBLICATIONS

Obarijima, Chujor O., and Sociis TA Okolie. "Application of Accelerometer in the Design and Adaptation of Active Suspension in Automobile." IOP Conference Series: Materials Science and Engineering. vol. 413. No. 1. IOP Publishing, 2018. (Year: 2018).*
(Continued)

*Primary Examiner* — Amandeep Saini
*Assistant Examiner* — Denise G Alfonso
(74) *Attorney, Agent, or Firm* — Walter Ottesen, P.A.

(57) ABSTRACT

The disclosure relates to a method for determining object information relating to an object in an environment of a vehicle having a camera. The method includes: capturing the environment with the camera from a first position; changing the position of the camera; capturing the environment with the camera from a second position; determining object information relating to an object by selecting at least one first pixel in the first image and at least one second pixel in the second image, by selecting the first pixel and the second pixel such that they are assigned to the same object point of the object, and determining object coordinates of the
(Continued)

assigned object point by triangulation. Changing the position of the camera is brought about by controlling an active actuator system in the vehicle. The actuator system adjusts the camera by an adjustment distance without changing a driving condition of the vehicle.

18 Claims, 3 Drawing Sheets

(51) Int. Cl.
  *G06V 10/44* (2022.01)
  *G06V 10/74* (2022.01)
  *G06V 10/771* (2022.01)
(52) U.S. Cl.
  CPC .. *G06V 10/771* (2022.01); *G06T 2207/30252* (2013.01); *G06V 2201/07* (2022.01)

(56) References Cited

U.S. PATENT DOCUMENTS

| | | |
|---|---|---|
| 2007/0047809 A1 | 3/2007 | Sasaki |
| 2015/0286878 A1 | 10/2015 | Molin et al. |
| 2017/0116758 A1 | 4/2017 | Grewe et al. |
| 2017/0308551 A1 | 10/2017 | Nomura |
| 2017/0372682 A1 | 12/2017 | Hashikawa et al. |
| 2018/0022346 A1* | 1/2018 | Murakami ........... B60G 17/015 701/37 |
| 2018/0165524 A1 | 6/2018 | Molin et al. |
| 2018/0181142 A1* | 6/2018 | Baran ...................... B60D 1/36 |
| 2018/0204072 A1 | 7/2018 | Al Rasheed et al. |
| 2019/0056749 A1* | 2/2019 | Kim ........................ B60J 5/047 |
| 2019/0124277 A1 | 4/2019 | Mabuchi |
| 2019/0197321 A1 | 6/2019 | Hughes et al. |
| 2020/0016951 A1* | 1/2020 | Letizio ............... B60G 17/0165 |
| 2020/0094645 A1* | 3/2020 | Edren ................... B60W 10/22 |
| 2020/0098135 A1* | 3/2020 | Ganjineh ............. G06V 20/588 |
| 2020/0322588 A1 | 10/2020 | Lindgren et al. |
| 2021/0295540 A1* | 9/2021 | Sato ........................ G06T 7/292 |
| 2022/0019815 A1 | 1/2022 | Molin et al. |

FOREIGN PATENT DOCUMENTS

| | | |
|---|---|---|
| CN | 109076163 A | 12/2018 |
| CN | 109313813 A | 2/2019 |
| CN | 109791603 A | 5/2019 |
| DE | 600 09 000 T2 | 3/2005 |
| DE | 10 2005 009 814 A1 | 9/2005 |
| DE | 10 2006 039 104 A1 | 1/2008 |
| DE | 10 2010 013 093 A1 | 9/2011 |
| DE | 10 2015 105 248 A1 | 10/2015 |
| DE | 10 2014 213 175 A1 | 1/2016 |
| DE | 11 2016 000 569 T5 | 11/2017 |
| DE | 10 2017 011 177 A1 | 6/2019 |
| DE | 10 2018 207 756 B3 | 9/2019 |
| EP | 1 405 776 A1 | 4/2004 |
| EP | 3 293 700 A1 | 3/2018 |
| WO | 2016/164118 A2 | 10/2016 |

OTHER PUBLICATIONS

Translation of Written Opinion of the International Searching Authority dated May 11, 2021 for international application PCT/EP2021/055826 on which this application is based.

International Search Report of the European Patent Office dated May 11, 2021 for international application PCT/EP2021/055826 on which this application is based.

* cited by examiner

METHOD FOR DETERMINING OBJECT INFORMATION RELATING TO AN OBJECT IN A VEHICLE ENVIRONMENT, CONTROL UNIT AND VEHICLE

CROSS REFERENCE TO RELATED APPLICATIONS

This application is a continuation application of international patent application PCT/EP2021/055826, filed Mar. 9, 2021 designating the United States and claiming priority from German application 10 2020 106 301.6, filed Mar. 9, 2020, and the entire content of both applications is incorporated herein by reference.

TECHNICAL FIELD

The disclosure relates to a method for determining object information relating to an object in an environment of a vehicle as well as to a control unit and a vehicle for carrying out the methods.

BACKGROUND

It is known from the prior art how a single camera can be used to determine the structure of the scene in 3D (so-called Structure from Motion (SfM)) via the forward or backward movement of a vehicle on which the camera is mounted. It is also known from the prior art that the determination of the baseline between two camera positions, which for the triangulation for depth determination is either known or must be estimated, can be supported by the evaluation of odometry data of the vehicle.

US 2018/0204072A1 also provides for cameras to be fixed to a trailer of a vehicle and trailer combination. In addition, driving dynamics sensors are provided that output odometry data relating to the vehicle movement, for example, a vehicle speed. The camera data output from the camera is compared with the odometry data, wherein the odometry data is used to compensate for the vehicle movement when processing the camera data to create images. Camera data from different cameras can also be combined.

US 2005/0201593 provides for camera data to be processed together with odometry data output from wheel speed sensors in order to determine a yaw rate. U.S. Pat. No. 6,483,429 also provides an image processing method taking into account odometry data of the vehicle in order to assist the driver when parking. In US 2015/0286878, US 2018/0165524 and US 2022/0019815, an image from a first camera is processed together with an image from a second camera in conjunction with odometry data, wherein the cameras can be arranged on a trailer and a towing vehicle of a multi-part vehicle. The images acquired by the various cameras and output in the form of camera data are combined. A combined image of the environment is generated as a result, wherein during cornering a bending angle is allowed for which characterizes the positions of the cameras in relation to one another. A bird's eye view can be taken over the entire multi-part vehicle to display the area surrounding the vehicle, for example to provide parking assistance.

US 2018/0181142 discloses an omni-directional camera, which captures object points of objects in an environment of the vehicle and outputs camera data depending on them. With the aid of a control unit in the vehicle, the camera data is processed by incorporating recorded odometry data, wherein the adametry data, for example, from wheel speed sensors, position sensors or a steering angle sensor, are received via the data bus of the vehicle. The object points in the environment of the vehicle that are of interest are detected by the camera and a distance to the object assigned to the detected object point is determined by the control unit on the basis of the odometry data. For this purpose, a plurality of images are acquired using the one camera, with the images being acquired from different positions with overlapping fields of view. By tracking object points, triangulation and bundle adjustment can be used to estimate depth information in the scene. The camera data is also displayed in the form of images on a display for the driver. The images and the distance determined facilitate the maneuvering of a passenger car as a towing vehicle to a trailer in order to connect it. Other objects such as the ground, pedestrians, et cetera, can be detected, but this presupposes sufficient movement of the vehicle, as this is the only way to set different positions for the camera.

The disadvantage is therefore that it is not possible, for example, to detect persons located on the ground when at a standstill or at very low, unresolvable speeds. There are also other types of objects in the vehicle environment that cannot be detected by "structure from motion" when the vehicle is not moving or only moving very slowly. This means that no spatial detection of the environment of the vehicle or an object can be achieved with only one camera when the vehicle is at a standstill, so that it is not possible to perform either automated classification of objects or distance determination.

However, the safety requirements for driverless industrial vehicles, in accordance with ISO 3691-4 for example, require the detection of persons located on the ground, so that they must be detected before starting the vehicle, that is, at a standstill or at very low speeds. Even at a traffic light or in a parked situation, no measurements of the distance or object classifications can be made, nor can additional spatial object information of an object be determined using the known systems.

SUMMARY

It is an object of the disclosure to specify a method for determining object information relating to an object, which enables a spatial observation of the vehicle environment even when the vehicle is at a standstill or at very low speeds with only one camera. It is an additional object to specify a control unit and a vehicle.

This object can, for example, be achieved via a method, a control unit and a vehicle as disclosed herein.

A method is provided for determining object information relating to an object in an environment of a vehicle, with the vehicle having at least one camera, having at least the following steps:
  capturing the environment with the at least one camera from a first position and, depending on this, creating a first image consisting of first pixels;
  changing the position of the at least one camera;
  capturing the environment with the at least one camera from a second position and, depending on this, creating a second image consisting of second pixels, the first position being different from the second position due to an intervening change in the position of the camera;
  determining object information relating to an object in the captured environment by:
  selecting at least one first pixel in the first image and at least one second pixel in the second image, by selecting the first pixel and the second pixel in such a way that they are assigned to the same object point of the object in the captured environment, and determining object coordinates of the assigned object point from first image coordinates of the at least one first pixel and from second image coordinates of the at least one second pixel by triangulation assuming a base length between the two positions of the camera.

The disclosure provides that changing the position of the at least one camera from the first position to the second position is brought about by controlling an active actuator system in the vehicle, wherein the active actuator system adjusts the at least one camera by an adjustment distance without changing a driving condition of the vehicle. The driving condition is defined as the movement state of the vehicle in its entirety, that is, for example, stationary or driving at a certain vehicle speed. The active actuator system does not change this movement, so the adjustment distance is not linked to the driving movement of the vehicle, so that the active actuator system differs from a drive system or a braking system, which directly affect the movement state of the entire vehicle.

It is thus advantageously ensured by the method according to the disclosure that a depth information or object information can also be determined with only one camera, regardless of the driving condition of the vehicle. This means that, even when the vehicle is stationary or when the vehicle speed is so low that no reliable inference can be made about the movement between the two positions from odometry data, triangulation can be used to determine the depth information or an approximation to the 3D position or the object coordinates of the respective object point. This only requires controlled activation of the active actuator system, which is independent of the vehicle movement. By triangulation, assuming a determined base length, but also without knowing the latter precisely, it is then initially possible to obtain at least one rudimentary item of depth information, for example an object form or an object contour.

This means that the actuator system for adjusting the camera between the positions is not only limited to times when the vehicle is stationary or traveling at low speeds. This means that an additional adjustment by the adjustment distance can be made via the active actuator system even while driving. This means that the object information can be determined more flexibly or in different driving conditions or driving situations.

It is preferably also provided that the base length between the two positions is determined from odometry data of the vehicle, wherein the odometry data are generated at least depending on the adjustment distance and the odometry data characterize an adjustment of the camera between the two positions. The base length is accordingly no longer only assumed, but rather is determined depending on the actively controlled adjustment distance, as a result of which the triangulation becomes more precise. The adjustment distance can be used here in addition to the vehicle movement (if available) when determining the depth information or the object coordinates, if this adjustment distance is taken into account in addition to the standard odometry data which affect the driving condition of the vehicle. This means that the object information or depth information can be determined more precisely and flexibly, or in different driving situations.

It is preferably also provided that a camera adjustment system is controlled as the active actuator system, which includes actuating motors and/or pneumatic cylinders and/or hydraulic cylinders and/or electric servo cylinders, wherein the at least one camera is directly attached to the camera adjustment system so that when the camera adjustment system is controlled the at least one camera is adjusted by the adjustment distance to change the position of the at least one camera. This means that in accordance with one embodiment, the camera can be adjusted directly without also moving the vehicle or parts of the vehicle, wherein the camera adjustment system is then mounted on the vehicle and aligned accordingly.

It is preferably also provided that an active air suspension system with air springs (ECAS) or a chassis adjustment system is controlled as the active actuator system, wherein by controlling the active air suspension system or the chassis adjustment system a vehicle body is adjusted in height by the adjustment distance so that the at least one camera fixed to the vehicle body is adjusted indirectly by the adjustment distance to change the position of the at least one camera.

This means that an actuator system that is already present in the vehicle can advantageously be used and can thus fulfil a dual function, that is, for example, it can raise and lower the body of the vehicle for air suspension, stabilization (rolling, tilting), et cetera, and can also direct the camera to the different positions. The air suspension system or chassis adjustment system needs only to be controlled in the appropriate situation for this purpose, which is possible in all driving situations, including in particular when stationary. In this case, the camera can be mounted freely on the vehicle body in order to move with it.

Furthermore, it is preferably also provided that a component adjustment system is controlled as the active actuator system, wherein by controlling the component adjustment system a component of the vehicle, such as a driver's cab and/or an aerodynamic component, is adjusted by the adjustment distance so that the at least one camera attached to this component is adjusted indirectly by the adjustment distance to change the position of the at least one camera.

This means that an actuator system can be used that does not raise and lower or adjust the entire vehicle body, but only individual components or parts. Such adjustment systems are already available in certain vehicles, so that they do not need to be retrofitted. The camera then only needs to be fixed to this component.

The active actuator systems mentioned can be provided individually or in combination with one another, for example to increase the variability and to enable combined adjustments with extended adjustment distances, if necessary.

It is preferably also provided that, when the active actuator system is controlled, the vehicle is in a driving condition in which the vehicle has a vehicle speed which is lower than a threshold speed, or the vehicle is at a standstill. The method is thus also advantageously suitable for situations in which conventional odometry via provided odometry data, for example wheel speed signals, bending angles, steering angles et cetera, cannot be used for reliably determining the depth information of the object because these are too imprecise. Via the active adjustment of the camera according to the disclosure, the method is rather independent of the traveling movement of the vehicle.

It is preferably also provided that the object coordinates or the object information for a plurality of object points are determined from the at least two images by triangulation and an object contour and/or an object shape is determined from the plurality of object points. The object can preferably be divided into object classes based on the object contour and/or the object form. This makes it easy, even at a standstill, to recognize and classify objects, in particular stationary objects, for example, persons.

In accordance with a further embodiment, it is provided that a plurality of cameras are provided and that object information relating to an object is determined from the disparity or the basic length using each camera by adjusting by the adjustment distance independently of one another according to the described method. Thus, the depth information or object information can preferably be determined from a plurality of sources, thereby increasing the reliability. This also makes it possible to check the plausibility of the object information determined from the plurality of cameras.

It is preferably also provided that more than two images are acquired at different positions and from each acquired image, pixels are selected which are assigned to the same object point of the object in the captured environment, wherein object coordinates of the assigned object point are determined from the image coordinates of the selected pixels by triangulation assuming a base length between the respective positions of the camera. This means that the respective object or respective object point can also be tracked for a longer time in order to determine the depth information or the respective object information more accurately or more reliably from it, if necessary via bundle adjustment. Multiple pixels can also be combined to form one or more feature points and the temporal correspondence of this or these feature points(s) between the individual images can be determined by triangulation.

It can additionally be provided that the determined object information, which follows from an adjustment of the camera by the adjustment distance via the active actuator system or from the adjustment distance as odometry data, is plausibility checked with object information which follows from odometry data of the vehicle, which is selected from the group consisting of: wheel speed signal and/or vehicle speed and/or steering angle and/or bending angle. This allows object information about an object derived from different movements of the camera to be compared. If, for example, the vehicle speed is very low, the reliability of the depth information determined from wheel speeds can no longer be guaranteed, for example in the case of passive wheel speed sensors, so that in addition to the plausibility check the camera is adjusted by the adjustment distance using the active actuator system and the depth information can be obtained from this.

According to the disclosure, a control unit and a vehicle equipped with such a control unit are also provided for carrying out the described methods, wherein the vehicle is one-part or multi-part and the at least one camera is arranged on a towing vehicle (with or without a trailer) and/or on a trailer of the vehicle.

BRIEF DESCRIPTION OF THE DRAWINGS

The invention will now be described with reference to the drawings wherein.

DESCRIPTION OF THE PREFERRED EMBODIMENTS

Figure 1A:
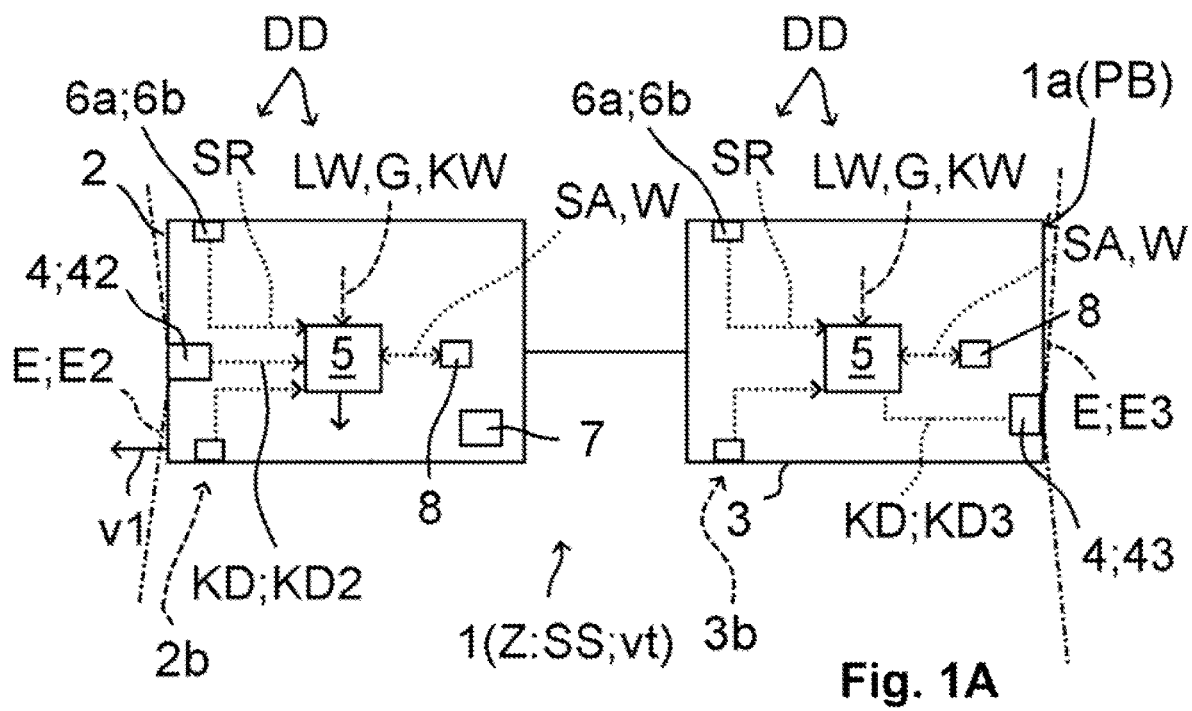
FIG. 1A shows a driving situation of a multi-part vehicle.

FIG. 1A schematically shows a multi-part vehicle 1 consisting of a towing vehicle 2 and a trailer 3, wherein according to the embodiment shown, a camera 4 with a detection range E is arranged on both vehicle parts 2, 3. On the towing vehicle 2 a towing vehicle camera 42 with a towing vehicle detection range E2 is arranged, and on the trailer 3 a trailer camera 43 with a trailer detection range E3 is arranged. The cameras 4, 42, 43 each output camera data KD, KD2, KD3.

Figure 1B:
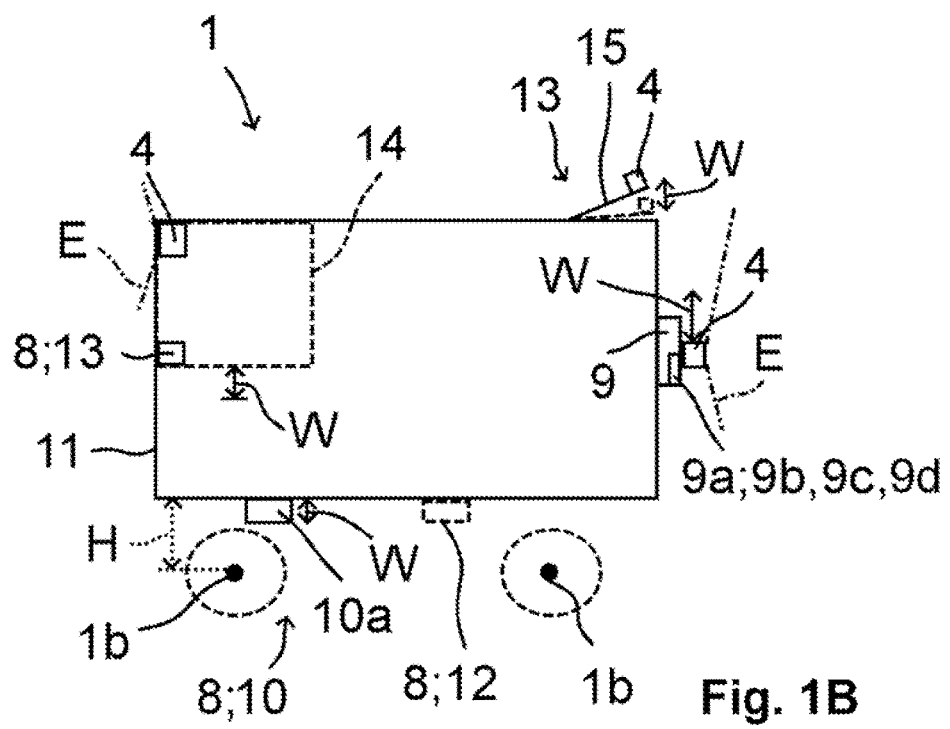
FIG. 1B shows a detailed view of the multi-part vehicle.

The vehicle 1 can be a multi-part vehicle, as shown in FIG. 1A, for example as a truck-and-trailer combination with a truck and drawbar trailer or turntable trailer, or as an articulated truck with a semi-trailer tractor and semi-trailer. In principle, however, the vehicle 1 can be only a one-part vehicle, as shown in FIG. 1B. The alignment of the camera 4 is selected depending on the respective application.

Figure 2A:
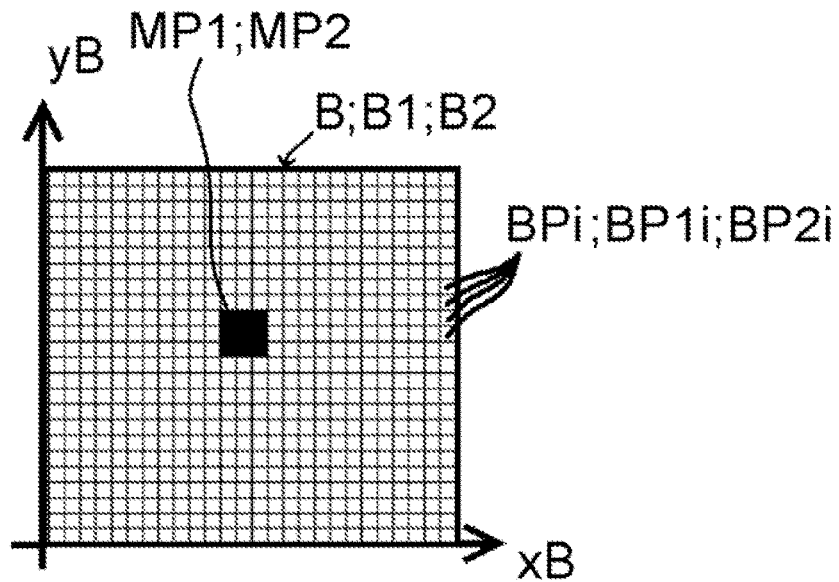
FIG. 2A shows an image captured by the camera.

The respective sets of camera data KD, KD2, KD3 are generated depending on an environment U around vehicle 1, to which the respective detection range E, E2, E3 is aligned. From each set of camera data KD, KD2, KD3 one image B can be created from pixels BPi with image coordinates xB, yB (see FIG. 2A), wherein each pixel BPi is assigned an object point PPi in the environment U (see FIG. 28). The object points PPi belong to objects O, which are located in the environment U and to which specific absolute object coordinates xO, yO, zO in space can be assigned. Depending on the position SP of the respective camera 4, 42, 43, object points PPi of an object O are displayed on different pixels BPi or with different image coordinates xB, yB in the images B.

The camera data KD, KD2, KD3 of each respective camera 4, 42, 43 is transmitted to a control unit 5 which is configured to determine object information OI as a function of the camera data KD, KD2, KD3 and as a function of the selected odometry data DD of the vehicle 1, which relate to the current driving situation of the vehicle 1 or the part vehicles 2, 3 and thus also characterize the movement of the camera 4, via a triangulation T generally known to the person skilled in the art. The object information OI indicates in particular spatial features of the respective object O in the environment U that is detected by the cameras 4, 42, 43.

For example, the object information OI used can include
 the absolute object coordinates xO, yO, zO (world coordinates) of the object O in space, and/or
 a distance A between a reference point PB, for example a rear side 1a of the vehicle 1 (in the case of a one-part vehicle 1) or of the trailer 3 (for a multi-part vehicle 1) or a current position SP of the respective camera 4, 42, 43, and the detected object O, or an object point PPi on the object O or a quantity correlated with it, and/or
 an object form OF or object contour OC, which is divided, for example, into n different object classes OKn, and/or
 an object dynamics OD, that is, a temporal movement of the detected object O in space.

Figure 2B:
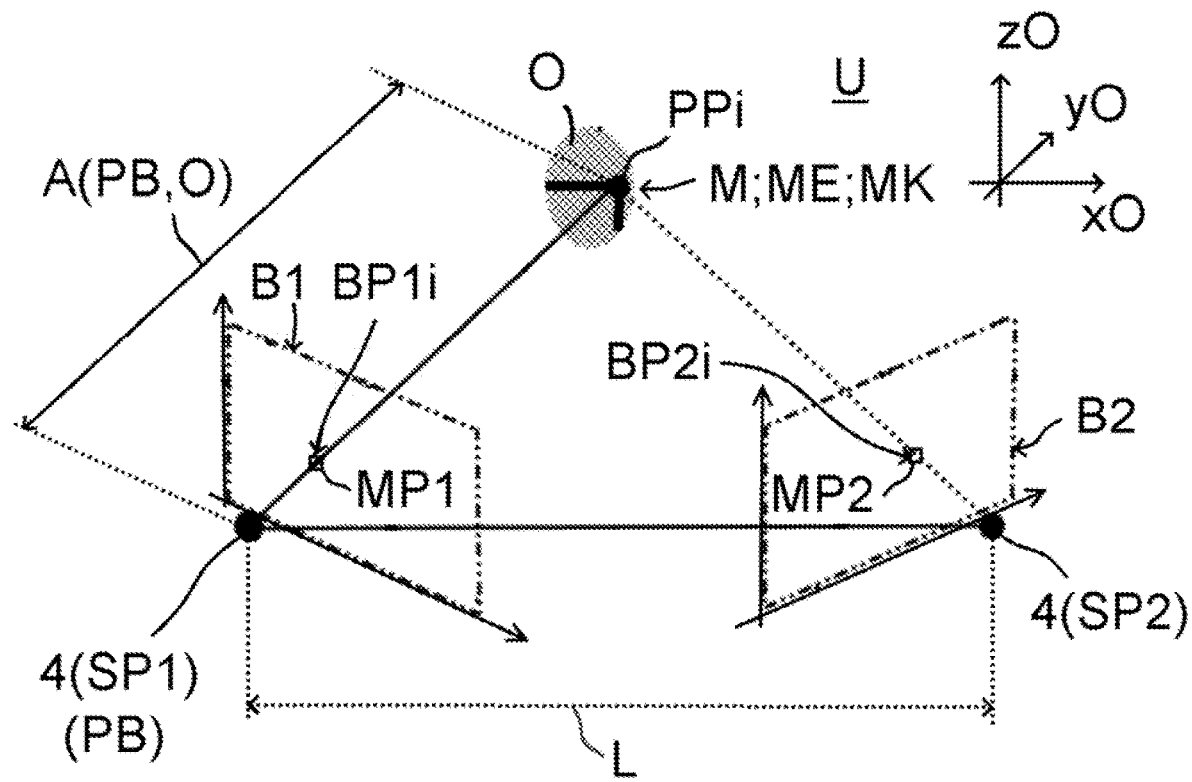
FIG. 2B shows the capture of an object point with a camera from different positions; and,
FIG. 3 shows a flow diagram of the method according to the disclosure.
Figure 3:
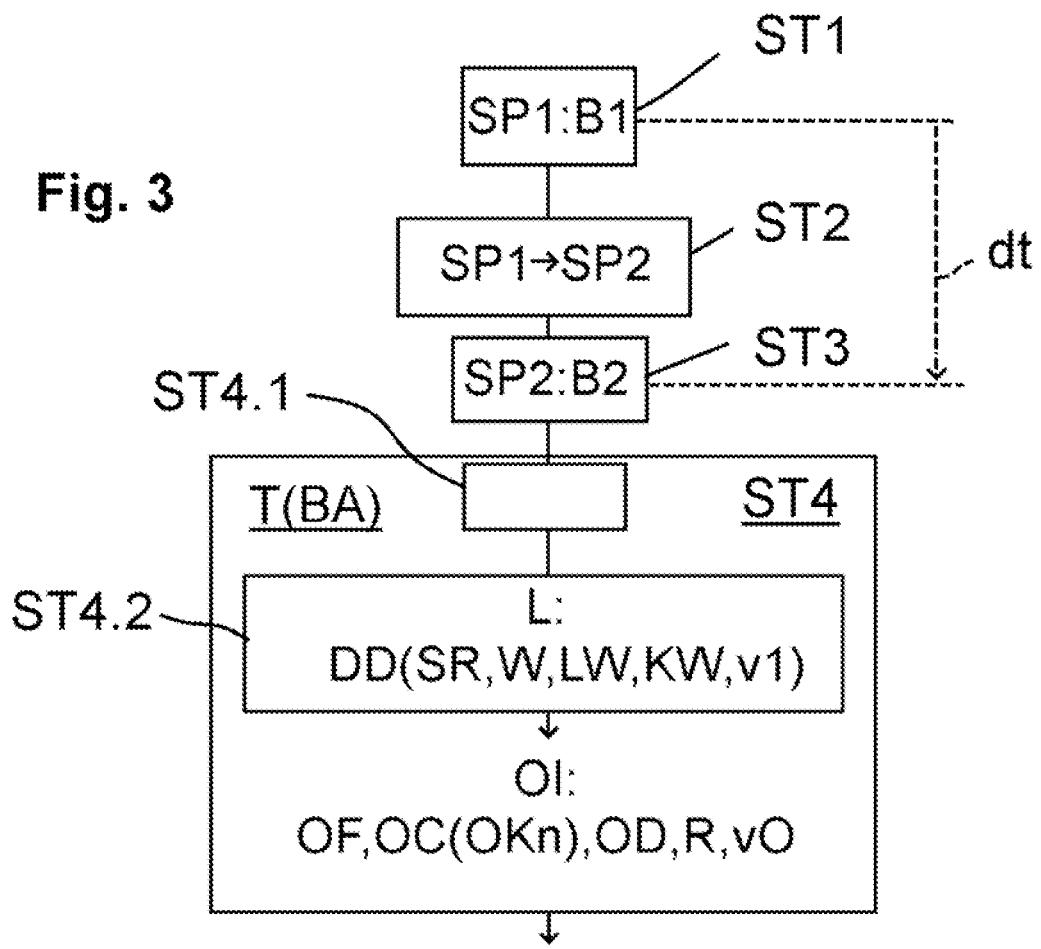

The object information OI is determined in accordance with the structure-from-motion (SfM) procedure, in which in substeps ST1, ST2, ST3 (see FIG. 3) an object O is captured by a camera 4 from at least two different positions SP1, SP2 (see FIG. 2B). By triangulation T, in a further step ST4, depth information relating to the object O or the respective object information OI can be obtained. As described in FIG. 2B, image coordinates xB, yB are determined for at least one first pixel BP1i in the first image B1 and for at least one second pixel BP2i in the second image B2, which are each assigned to the same object point PPi (ST4.1).

In order to simplify the process, a certain number of pixels BP1i, BP2i in the respective image B1, B2 can be combined in a feature point MP1, MP2 (see FIG. 2A), wherein the pixels BP1$i$, BP2$i$ to be combined are selected in such a way that the respective feature point MP1, MP2 is assigned to a specific, uniquely locatable feature M on the object O (see FIG. 2B). For example, the feature M can be a corner ME or an edge MK on the object O, which can be extracted from the entire images B1, B2 and the pixels BP1$i$, BP2$i$ of which can be combined in the feature points MP1, MP2.

In an approximation, an object form OF or an object contour OC can be at least estimated by triangulation T from the image coordinates xB, yB of the individual pixels BP1$i$, BP2$i$ or the feature points MP1, MP2 which are assigned to the same object points PPi or the same feature M in the at least two images B1, B2. For this purpose, the image coordinates xB, yB of a plurality of pixels BP1$i$, BP2$i$ or a plurality of feature points MP1, MP2 can be subject to a triangulation. T to obtain object coordinates xO, yO, zO, which are not necessarily located on the object O in space, however.

Without the knowledge of an exact base length L, that is, a distance between the different positions SP1, SP2 of the camera 4, the triangulation T results in object coordinates xO, yO, zO in unscaled form. This means that only an unscaled object form OF or object contour OC can be derived from object coordinates xO, yO, zO determined in this way, but this is sufficient for determining the shape or the contour. For the triangulation T, any base length L can be assumed.

In order to enable the additional above-mentioned object information OI to be determined via triangulation T, the actual base length L is additionally used. If, according to FIG. 2B, the relative positions and thus the base length L between the different positions SP1, SP2 of the camera 4 at which the two images B1, B2 were acquired are known or have been determined, then the absolute object coordinates xO, yO, zO (world coordinates) of the object O or the object point PPi or the feature M can be determined by triangulation. T. From this, in turn the distance A between the reference point. PB and the detected object O or an object point PPi on the object O can be determined, wherein the coordinates of the reference point PB in the world coordinates follow directly from geometrical considerations.

In this way, the control device 5 can estimate an object contour OC or object form OF that is scaled relative to the above case if the exact object coordinates xO, yO, zO of a plurality of object points PPi or features M are determined. From the object contour OC, the object O can in turn be classified into a specific object class OKn. This process can also take into account the object dynamics OD, for example, a movement direction R of the object point or points PPi and/or an object speed vO, if the object points PPi are observed in a temporally resolved manner.

For example, objects O recognized as persons can be classified in a first object class OK1. Objects O such as signs, loading ramps, houses, et cetera, can be classified in a second object class OK2 as fixed objects. Objects O, such as other vehicles, can be classified in a third object class OK3 as moving objects.

In order to determine the determined object information OI even more precisely it can be additionally provided that more than two images B1, B2 are acquired and evaluated by triangulation T as described above, and/or that a bundle adjustment BA is also carried out.

As already described, for the SfM procedure the object O must be observed by the camera 4 from at least two different positions SP1, SP2, as shown schematically in FIG. 2B. For this purpose, the camera 4 must be moved into the different positions SP1, SP2 in a controlled manner in the substep ST2 and, in the scaled case, determined on the basis of odometry data OD, which results in base length L from this movement between the points SP1, SP2 (ST4, ST4.2). Different approaches can be applied to this problem:

If the entire vehicle 1 is in motion, then this alone will result in a movement of the camera 4. This means that the vehicle 1 in its entirety is actively set in motion, for example by a drive system 7, or passively, for example by a downward slope. If the camera 4 acquires at least two images B1, B2 within a temporal offset dt during this movement, the base length L can be determined using odometry data DD, from which the vehicle movement and thus also the camera movement can be derived. Odometry is thus used to determine the two positions SP1, SP2 assigned to the images B1, B2.

The odometry data DD can be formed, for example, by wheel speed signals SR from active and/or passive wheel speed sensors 6$a$, 6$p$ on the wheels of the vehicle 1 (see FIG. 1A). Depending on the temporal offset dt, it is possible to determine from these how far the vehicle 1 or the camera 4 has moved between the positions SP1, SP2, from which the base length L follows. However, it is not necessary to use only the vehicle odometry, that is, the assessment of the vehicle movement on the basis of motion sensors on the vehicle 1. A visual odometry can also be used as a supplement or alternative. In the case of visual odometry, a camera position can be determined continuously from the camera data KD of the camera 4 or from information in the acquired images B; B1, B2, provided, for example, object coordinates xO, yO, zO of a specific object point PPi are known, at least initially. The odometry data DD can also contain a dependency on the camera position determined in this way, since the vehicle movement between the two positions SP1, SP2, or even the base length L directly, can be derived from this data.

In order to make the odometric determination of the base length L during a movement of the vehicle 1 more accurate, additional odometry data. DD available in the vehicle 1 can be used. For example, a steering angle LW and/or a yaw rate G can be used to also take into account the rotational movement of the vehicle 1. In a two-part or multiple-part vehicle 1, a bending angle KW between the towing vehicle 2 and the trailer 3 can additionally be used to take account of the exact dynamics of the trailer 3, in particular during maneuvering operations.

If the one-part vehicle 1 or the multi-part vehicle 1 with its vehicle parts 2, 3 is not moving, or if the movement within the time offset dt is so small that the odometry data DD is so inaccurate that it cannot provide a reliable determination of the base length L, then the camera 4 can also be set in motion via an active actuator system 8 in sub-step ST2. The movement of the camera 4 which is effected by the actuator system 8 differs from the movement of the vehicle 1 observed so far, in particular in that the actuator system 8 only sets in motion the camera 4 or a vehicle section connected to the camera 4. The movement of the vehicle 1 in its entirety or a driving condition Z of the vehicle 1 are not changed by this, so that a stationary vehicle 1 remains at a standstill SS during an active control of the actuator system 8.

The actuator system 8 is controlled by the control unit 5 via actuator signals SA. This can occur, for example, if the control unit 5 detects that the odometry data DD characterizing the movement of the entire vehicle 1, that is, the wheel speed signals SR and/or the steering angle LW and/or the yaw rate G and/or the camera data KD, are not accurate or detailed enough to determine the base length L. This can be the case if the standstill SS of the vehicle 1 has been detected or if a vehicle speed v1 is lower than a speed threshold vt.

When the actuator system 8 is activated, the camera 4 is moved directly or indirectly and thus placed at different positions SP1, SP2 so that the environment U can be captured in at least two different images B1, B2. This allows the SfM procedure to be performed as described above. In order to determine the base length L in this case, the control unit 5 uses an adjustment distance W by which the camera 4 is moved between the two positions SP1, SP2 by the actuator system 8. The adjustment distance W is transferred to the control unit 5 by the actuator system 8. The control unit 5 can also take the adjustment distance W of the actuator unit 8 into account in the odometry data DD in order to determine the base length L.

Different systems in the vehicle 1 can be considered for use as actuator systems 8, which are shown schematically in FIG. 1B for a one-part vehicle 1, but which can also be used on part vehicles 2, 3 of multi-part vehicles 1. For example, the camera 4 can be mounted on a camera adjustment system 9 with one or more actuator motor(s) 9a or pneumatic cylinder(s) 9b or hydraulic cylinder(s) 9c or electric servo cylinder(s) 9d or similarly operating actuators, with the camera adjustment system 9 being mounted on the vehicle 1 in such a way that the detection range E is aligned as desired. In this case, the camera 4 can be moved into the different positions SP1, SP2 by adjusting the actuator motor (s) 9a, pneumatic cylinder 9b, hydraulic cylinder 9c, servo cylinder(s) 9d by a specific adjustment distance W when actuated.

Another possibility for an active actuator system 8 is an active air suspension system 10 (ECAS, Electronically Controlled Air Suspension), which in a one-part vehicle 1 or in a multi-part vehicle 1 in a towing vehicle 2, or even in a trailer 3, uses air springs 10a configured as air-spring bellows to ensure that a vehicle body 11 is adjusted in its height H with respect to the vehicle axles 1b, 2b, 3b of the vehicle 1 or the towing vehicle 2 or the trailer 3, that is, can be raised or lowered. For this purpose, a pressure in the air springs 10a can be selectively adjusted. This can be used to achieve optimum suspension independently of road conditions or load conditions to dynamically compensate for a change in axle load distribution, to avoid rolling or tilting during cornering, or to adjust the height H of the vehicle body 11 when coupling a towing vehicle 2 to a trailer 3 and during loading and unloading operations, for example on a loading ramp.

If the respective camera 4, 4a, 4b is arranged on the vehicle body 11 of the vehicle 1 or the towing vehicle 2 or the trailer 3, a selective control of the active air spring system 10 by the control unit 5 can be used to effect an adjustment of the camera 4, preferably its height H, by an adjustment distance W in order to position it at two different positions SP1, SP2. Since the adjustment distance W is known to the active air spring system 10 and/or can be measured, this distance can also be transmitted to the control unit 5 so that it can take the adjustment distance W effected by the active air spring system 10 into account in the odometry data DD in order to determine the base length L.

In this way, the control unit 5 can instruct the active air spring system 10 to adjust the respective camera 4 when the vehicle 1 is at a standstill SS, thus providing a further means that can be used in an SfM procedure to determine the respective object information OI for at least one object point PPi by triangulation T. In principle, the control unit 5 can also even specify the adjustment distance W as the target value which the active air spring system 10 is instructed to set by changing the pressure in the air springs 10a. However, in order to determine the object form OF or the object contour OC unsealed by triangulation T, the adjustment distance W (or the base length L) can also be disregarded, for example if the adjustment distance W is not or cannot be measured.

In addition to an active air suspension system 10, any comparable active suspension adjustment system 12 can also be used as the additional active actuator system 8, provided it is able to adjust the height H of the vehicle body 11 and thus to position the camera 4 arranged on it at two different positions SP1, SP2 in a targeted manner. However, the active actuator system 8 can also be formed by a component adjustment system 13 which can only raise or lower a part or component of the vehicle body 11 to which the camera 4 is attached, for example a driver's cab 14, by the adjustment distance W. Other possible components include aerodynamic components 15, such as aerodynamic fins or spoilers, on which a camera 4 can be mounted and which can be actively adjusted to selectively reposition the camera 4 by an adjustment distance W.

This means that there are a number of possible ways to position the camera 4 actively and selectively at different positions SP1, SP2, in order to acquire two images B1, B2 of an object O and from these to determine the respective object information OI (scaled or unsealed) for one or more object points PPi.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Vehicle
1a rear side of the vehicle 1
1b Vehicle axle of the vehicle 1
2 Towing vehicle
2b Vehicle axis of the towing vehicle 2
3 Trailer
3b Vehicle axle of the trailer 3
4 Camera
42 Towing vehicle camera.
43 Trailer camera
5 Control unit
6a active wheel speed sensor
6p passive wheel speed sensor
7 Drive system
8 active actuator system
9 Camera positioning system
9a Actuator motor
9b pneumatic cylinder
9c hydraulic cylinder
9d electric servo cylinder
10 active air suspension system (ECAS)
10a air springs
11 Vehicle body
12 Suspension positioning system
13 Component positioning system
14 Driver's cab
15 aerodynamic component
A Distance
B Image
B1 first image
B2 second image BA bundle adjustment
BPi Pixels
BP1i first pixel
BP2i second pixel
DD Odometry data
dt temporal offset
E Detection range of the camera
E2 first detection range of the towing vehicle camera
E3 second detection range of the trailer camera
G Yaw rate
H Height of the vehicle body
KD Camera data of the camera
KD2 first camera data of the towing vehicle camera
KD3 second camera data of the trailer camera
L Base length
LW Steering angle
M Feature
MP1, MP2 Feature point
ME Corner (as a feature)
MK Edge (as a feature)
O Object
OC Object contour
OD Object dynamics
OF Object form
OI Object information
OKn nth object class
PB Reference point
PPi Object Point
R Direction of motion
SA Actuator signal
SP Position of the camera 4
SP1 first position of the camera
SP2 second position of the camera
SR Wheel speed signals
SS Standstill
T Triangulation
U Environment of the vehicle 1
Vehicle speed
vO Object speed
vt Speed threshold
W Adjustment distance
Z Driving condition

What is claimed is:

1. A method for determining object information of an object in an environment of a vehicle, the vehicle having at least one camera, the at least one camera having a position, the method comprising:
capturing the environment with the at least one camera from a first position and, in dependence thereon, generating a first image having first pixels;
changing the position of the at least one camera;
capturing the environment with the at least one camera from a second position and, in dependence thereon, creating a second image having second pixels;
determining object information relating to the object in the captured environment by
selecting at least one first pixel in the first image and at least one second pixel in the second image, the at least one first pixel and the at least one second pixel being selected such that they are assigned to a same object point of the object in the captured environment, and
determining object coordinates of the assigned object point from first image coordinates of the at least one first pixel and from second image coordinates of the at least one second pixel by triangulation, assuming a base length between the two positions of the camera;
wherein said changing the position of the at least one camera from the first position to the second position is brought about by controlling an active actuator system in the vehicle, wherein the active actuator system adjusts the at least one camera by an adjustment distance without changing a driving condition of the vehicle in all operating conditions of the vehicle including movement and non-movement of the vehicle,
wherein an active air suspension system with air springs or a chassis adjustment system is controlled as the active actuator system, wherein by controlling the active air suspension system or the chassis adjustment system, a vehicle body is adjusted in height by the adjustment distance so that the at least one camera fixed to the vehicle body is adjusted indirectly by the adjustment distance to change the position of the at least one camera, and
wherein said changing the position of the at least one camera is performed while the vehicle is moving.

2. The method of claim 1, wherein the base length between the first position and the second position of the camera is determined from odometry data of the vehicle; and, the odometry data are generated at least depending on the adjustment distance and the odometry data characterize an adjustment of the camera between the first position and the second position.

3. The method of claim 1, wherein a camera adjustment system is controlled as the active actuator system; the active actuator system comprises at least one of actuating motors, pneumatic cylinders, hydraulic cylinders, and electric servo cylinders; and, the at least one camera is fixed directly to the camera adjustment system so that when the camera adjustment system is controlled the at least one camera is adjusted by the adjustment distance to change the position of the at least one camera.

4. The method of claim 1, wherein a component adjustment system is controlled as the active actuator system, wherein by controlling the component adjustment system, a component of the vehicle is adjusted by the adjustment distance so that the at least one camera attached to this component is adjusted indirectly by the adjustment distance to change the position of the at least one camera.

5. The method of claim 4, wherein the component is at least one of a driver's cab and an aerodynamic component.

6. The method of claim 1, wherein, when the active actuator system is controlled, the vehicle is in the driving condition in which the vehicle has a vehicle speed which is lower than a threshold speed, or the vehicle is at a standstill.

7. The method of claim 1, wherein the object coordinates for a plurality of object points are determined from the first image and the second image by triangulation; and, at least one of an object contour and an object form is determined from the plurality of object points.

8. The method of claim 7, wherein the object is divided into object classes via at least one of the object contour and the object form.

9. The method of claim 1, wherein a plurality of cameras are provided and object information relating to the object is determined via each camera by adjusting by the corresponding adjustment distance independently of one another.

10. The method of claim 9, further comprising plausibility checking the object information determined by the plurality of cameras.

11. The method of claim 1, wherein more than two images are acquired at different positions and, from each acquired image, pixels are selected which are assigned to the same object point of the object in the captured environment, wherein the object coordinates of the assigned object point are determined from image coordinates of the selected pixels by triangulation assuming a base length between respective positions of the camera.

12. The method of claim 1, wherein a bundle adjustment is carried out via the first image and the second image.

13. The method of claim 1, wherein a plurality of first pixels in the first image are combined into a first feature point and a plurality of second pixels in the second image are combined into a second feature point, the first feature point and the second feature point being selected such that they are assigned to a same feature of the object in the captured environment; and, wherein the object coordinates of the assigned feature are determined from first image coordinates of the first feature point and from second image coordinates of the second feature point by triangulation, assuming a base length between the first position and the second position of the camera.

14. The method of claim 1 further comprising plausibility checking the determined object information, which follows from an adjustment of the camera by the adjustment distance via the active actuator system with object information which follows from odometry data of the vehicle, wherein the odometry data includes at least one of a wheel speed signal, a vehicle speed, a steering angle, and bending angle.

15. The method of claim 1, wherein, when the active actuator system is controlled, the vehicle is in the driving condition in which the vehicle is moving.

16. A control unit for determining object information of an object in an environment of a vehicle having a camera, the control unit comprising:

a processor;

a non-transitory computer readable storage medium having program code stored thereon;

said program code being configured to capture the environment with said camera from a first position and, in dependence thereon, generate a first image having first pixels;

said program code being configured to change the position of the camera and to capture the environment via the camera from a second position and, in dependence thereon, generate a second image having second pixels;

said program code being configured to determine the object information in the captured environment by selecting at least one first pixel in the first image and at least one second pixel in the second image, the at least one first pixel and the at least one second pixel being selected such that they are assigned to a same object point of the object in the captured environment, and determining object coordinates of the assigned object point from first image coordinates of the at least one first pixel and from second image coordinates of the at least one second pixel by triangulation assuming a base length between the two positions of the camera;

wherein the changing the position of said camera via the control unit is brought about by controlling an active actuator system in the vehicle, wherein the active actuator system adjusts said camera by an adjustment distance without changing a driving condition of the vehicle in all operating conditions of the vehicle including movement and non-movement of the vehicle, wherein an active air suspension system with air springs or a chassis adjustment system is controlled as the active actuator system, wherein by controlling the active air suspension system or the chassis adjustment system, a vehicle body is adjusted in height by the adjustment distance so that the at least one camera fixed to the vehicle body is adjusted indirectly by the adjustment distance to change the position of the at least one camera, and wherein said changing the position of the camera is performed while the vehicle is moving.

17. A vehicle comprising:

a camera defining a position;

a control unit for determining object information of an object in an environment of the vehicle;

said control unit being configured to capture the environment with said camera from a first position and, in dependence thereon, generate a first image having first pixels;

said control unit being configured to change the position of the camera and to capture the environment via the camera from a second position and, in dependence thereon, generate a second image having second pixels;

said control unit being further configured to determine the object information in the captured environment by selecting at least one first pixel in the first image and at least one second pixel in the second image, the first pixel and the second pixel being selected such that they are assigned to a same object point of the object in the captured environment, and determining the object coordinates of the assigned object point from first image coordinates of the at least one first pixel and from second image coordinates of the at least one second pixel by triangulation assuming a base length between the two positions of the camera; and, wherein the changing the position of said camera via the control unit is brought about by controlling an active actuator system in the vehicle, wherein the active actuator system adjusts said camera by an adjustment distance without changing a driving condition of the vehicle in all operating conditions of the vehicle including movement and non-movement of the vehicle, wherein an active air suspension system with air springs or a chassis adjustment system is controlled as the active actuator system, wherein by controlling the active air suspension system or the chassis adjustment system, a vehicle body is adjusted in height by the adjustment distance so that the at least one camera fixed to the vehicle body is adjusted indirectly by the adjustment distance to change the position of the at least one camera, and wherein said changing the position of the camera is performed while the vehicle is moving.

18. The vehicle of claim 17, wherein the vehicle is a multipart vehicle having a towing vehicle and a trailer; and, said camera is arranged on at least one of said towing vehicle and said trailer.

* * * * *